US011963021B2

United States Patent
Zhou et al.

(10) Patent No.: US 11,963,021 B2
(45) Date of Patent: Apr. 16, 2024

(54) ADAPTIVE SPATIAL REUSE

(71) Applicant: HEWLETT PACKARD ENTERPRISE DEVELOPMENT LP, Houston, TX (US)

(72) Inventors: Qiang Zhou, Santa Clara, CA (US); Mohd Shahnawaz Siraj, Santa Clara, CA (US); Andre Beaudin, St. Laurent (CA)

(73) Assignee: Hewlett Packard Enterprise Development LP, Spring, TX (US)

( * ) Notice: Subject to any disclaimer, the term of this patent is extended or adjusted under 35 U.S.C. 154(b) by 260 days.

(21) Appl. No.: 17/501,972

(22) Filed: Oct. 14, 2021

(65) Prior Publication Data
US 2023/0119650 A1 Apr. 20, 2023

(51) Int. Cl.
*H04W 24/02* (2009.01)
*H04B 17/318* (2015.01)
*H04W 24/10* (2009.01)
*H04W 84/12* (2009.01)

(52) U.S. Cl.
CPC .......... *H04W 24/02* (2013.01); *H04B 17/318* (2015.01); *H04W 24/10* (2013.01); *H04W 84/12* (2013.01)

(58) Field of Classification Search
CPC ...... H04B 1/52; H04B 1/401; H04W 72/0453
USPC ................. 370/329, 400, 403, 486
See application file for complete search history.

(56) References Cited

U.S. PATENT DOCUMENTS

| | | | |
|---|---|---|---|
| 9,924,474 B2 | 3/2018 | Yang et al. | |
| 10,117,106 B2 | 10/2018 | Barriac et al. | |
| 10,390,230 B2 | 8/2019 | Lan et al. | |
| 2017/0223563 A1 | 8/2017 | Yang et al. | |
| 2018/0054818 A1 | 2/2018 | Kakani et al. | |
| 2018/0270038 A1 | 9/2018 | Oteri et al. | |
| 2020/0083969 A1 | 3/2020 | Patwardhan et al. | |
| 2020/0187011 A1 | 6/2020 | Malichenko et al. | |
| 2020/0288323 A1 | 9/2020 | Silverman et al. | |
| 2022/0308195 A1* | 9/2022 | Zeng ..................... | G01S 13/003 |

FOREIGN PATENT DOCUMENTS

WO    WO-20180164711    *   9/2018

* cited by examiner

*Primary Examiner* — Dang T Ton
(74) *Attorney, Agent, or Firm* — Sheppard Mullin Richter & Hampton LLP

(57) ABSTRACT

Systems and methods are provided for adaptively enabling and disabling spatial reuse and adapting BSS color assignments based on various factors associated with a wireless network. A first AP in a wireless network can identify a second AP in a wireless network. The first AP and the second AP may be using the same wireless channel in the wireless network. The first AP can determine a signal strength, such as a received signal strength indicator (RSSI), associated with the second AP. The first AP can adapt its spatial reuse and BSS color assignment according to the signal strength and a signal strength threshold. By adaptively enabling and disabling spatial reuse and adapting BSS color assignments, the disclosed systems and methods provide for improved reuse of wireless mediums while avoiding collisions.

17 Claims, 9 Drawing Sheets

ADAPTIVE SPATIAL REUSE

BACKGROUND

Today, advances in wireless networking technologies drive improvements in other technology fields. For example, various technology fields, as well as various industries, rely on wireless networking technologies for the communication, storage, and delivery of data and services. While advances in wireless networking technologies have provided improvements in other technologies and industries, these advances have also led to large scale proliferation of wireless electronic devices. This large scale proliferation of wireless electronic devices creates technological challenges in wireless networking technologies. For example, the large scale proliferation of wireless electronic devices has led to technological challenges in trying to accommodate an increasing number of users on wireless communication channels. A large number of users on a wireless communication channel may cause high levels of interference, which may degrade network performance for the users on the wireless communication channel. The Institute of Electrical and Electronics Engineers (IEEE) has issued various standards, such as the 802.11 standard to address various technological challenges arising in wireless networking technologies. Nevertheless, wireless networking technologies continue to face technological challenges.

BRIEF DESCRIPTION OF THE DRAWINGS

The present disclosure, in accordance with one or more various embodiments, is described in detail with reference to the following figures. The FIGS. are provided for purposes of illustration only and merely depict typical or example embodiments.

Figure 1A:
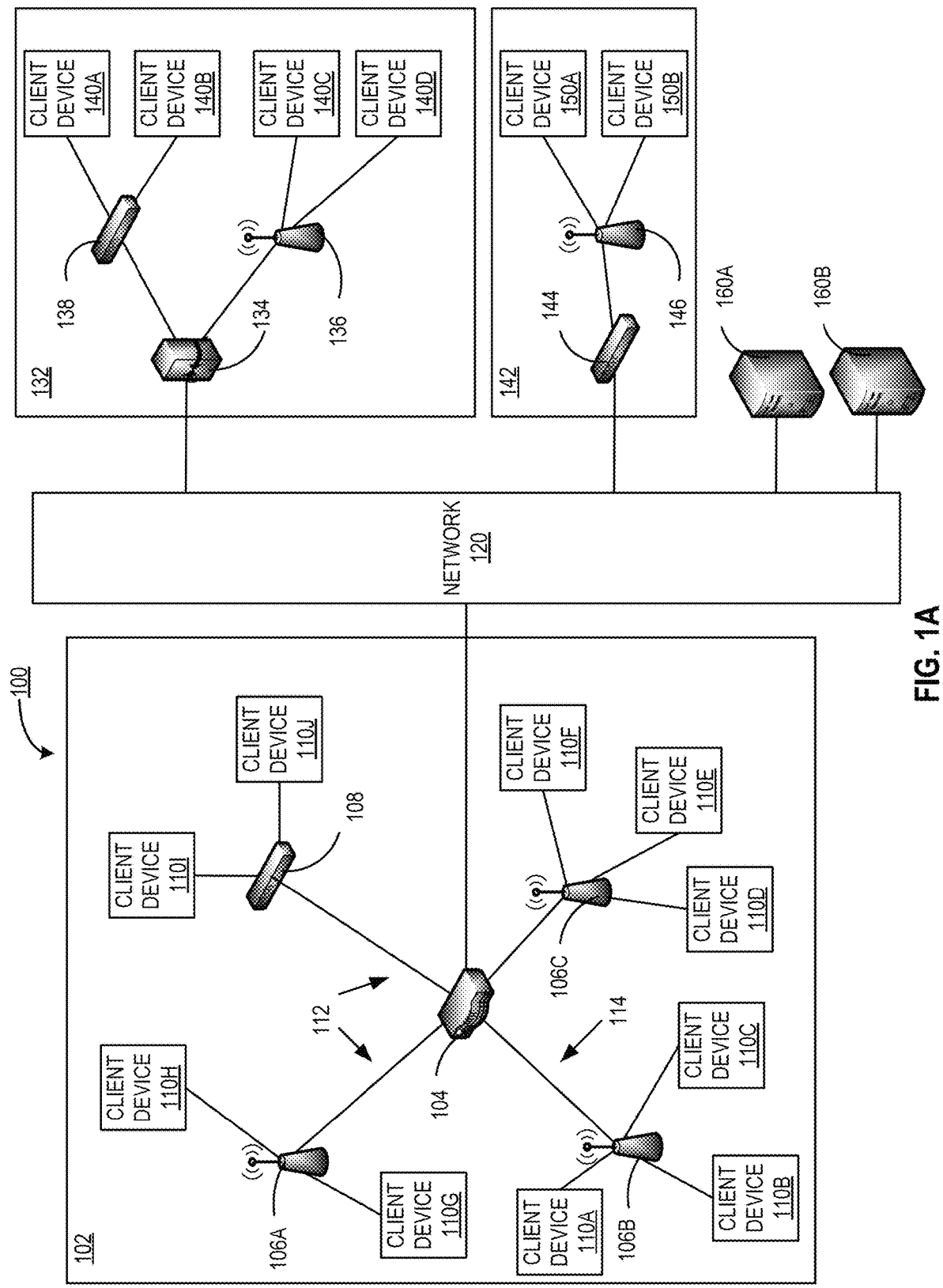
FIG. 1A illustrates one example of a wireless network deployment that may be implemented for an organization, such as a business, educational institution, governmental entity, healthcare facility or other organization.

The figures are not exhaustive and do not limit the present disclosure to the precise form disclosed.

DETAILED DESCRIPTION

Large scale proliferation of wireless electronic devices creates various technological challenges in wireless networking technologies. For example, increased density in wireless networks has created technological challenges associated with increased interference in wireless networks. In some situations, network devices, including access points (APs) and client devices, of a wireless network may attempt to communicate with each other. The communication signal from one network device may disrupt or weaken the communication signal from another network device. When APs and client devices of a wireless network attempt to communicate with each other at the same time, using the same frequency channel, and are within a close enough physical proximity to hear (e.g., detect) each other, then collisions may occur. Collisions on a wireless network can result in packet loss and network performance degradation.

Various approaches to improving wireless networking technologies are directed to facilitating parallel transmissions on the same channel and improving throughput in a wireless network. For example, overlapping basic service sets (OBSS) can refer to situations where multiple basic service sets, associated with different wireless networks, are provided through the same channel, and connect APs and client devices that are close enough in physical proximity to hear each other physically. In situations such as these, basic service set (BSS) color assignments can provide for differentiation of basic service sets transmitted on the same channel. Furthermore, spatial reuse allows multiple devices associated with different BSSs on the same channel to transmit simultaneously if certain conditions, such as clear channel assessment (CCA) thresholds, are met. In general, spatial reuse involves distinguishing between inter-BSS/ inter-CCA and intra-BSS/intra-CCA frames on the same channel based on their associated BSS color assignments. Depending on whether certain conditions, such as CCA thresholds, are met, an AP or client device may defer access to another AP or another client device.

Various approaches to spatial reuse are intended to increase total capacity of a channel by allowing simultaneous transmissions on the same channel. In one approach, spatial reuse can adapt CCA thresholds and adjust signal level thresholds to allow OBSSs to transmit simultaneously. This approach can involve manipulating transmit power, such as Effective Isotropic Radiated Power (EIRP), which also has an effect on the coverage associated with signal. In this approach, spatial reuse relies on a EIRP where a receiver can withstand some interference caused by a simultaneous transmission. The receiver can, accordingly, receive and decode packets simultaneously despite the interference. However, the advantages of this approach, and other approaches to spatial reuse, diminishes in dense wireless deployments, such as mesh deployments or distributed multiple input multiple output (D-MIMO) deployments. In dense wireless deployments, the use of spatial reuse may cause an increase in collisions and packet loss due to lower signal-to-interference-plus-noise ratio (SINR) caused by interference and lower transmit power. The increase in collisions and packet loss can lead to retransmissions and longer transmission times, which degrades overall network performance. Thus, the use of spatial reuse in dense wireless deployments present technological challenges arising in the field of wireless networking technology.

Accordingly, disclosed are systems and methods for providing adaptive spatial reuse. In various embodiments, the disclosed systems and methods provide for adaptively enabling and disabling spatial reuse and adapting BSS color assignments based on various factors associated with a wireless network. A first AP in a wireless network can identify a second AP in a wireless network. The first AP and the second AP may be using the same wireless channel in the wireless network. The first AP can determine a signal strength associated with the second AP. For example, the first AP can determine the signal strength based on a received signal strength indicator (RSSI). The signal strength can indicate a proximity of the second AP to the first AP, and the first AP can adapt its spatial reuse and BSS color assignment accordingly. Based on the signal strength associated with the second AP, the first AP can determine whether to enable or disable spatial reuse and to select a BSS color assignment based on the BSS color assignment of the second AP. For example, if the signal strength associated with the second AP is above a signal strength threshold (e.g., RSSI threshold), indicating a relatively close physical proximity, then the first AP may adapt to the proximity of the second AP by disabling spatial reuse and selecting a BSS color assignment that matches the BSS color assignment of the second AP. By disabling spatial reuse and selecting the same BSS color assignment as the second AP, the first AP avoids collisions, and retransmissions, associated with parallel transmissions using spatial reuse where a dense wireless deployment makes the use of spatial reuse inefficient. If the signal strength associated with the second AP is below the signal strength threshold, indicating a relatively far physical proximity, then the first AP may adapt to the proximity of the second AP by enabling spatial reuse and selecting a BSS color assignment that is different from the BSS color assignment of the second AP. By enabling spatial reuse and selecting a different BSS color assignment from that of the second AP, the first AP can take advantage of parallel transmissions using spatial reuse in a wireless deployment where collisions, and retransmissions, may be more likely to be avoided and spatial reuse can be used efficiently. By adaptively enabling and disabling spatial reuse and adapting BSS color assignments, the disclosed systems and methods provide for improved reuse of wireless mediums while avoiding collisions. Thus, the disclosed systems and methods for adaptive spatial reuse provide improvements in wireless networking technologies, as further descried herein.

Before describing embodiments of the disclosed systems and methods in detail, it may be useful to describe an example network installation with which these systems and methods might be implemented in various applications. FIG. 1A illustrates one example of a network configuration 100 that may be implemented for an organization, such as a business, educational institution, governmental entity, healthcare facility or other organization. This diagram illustrates an example of a configuration implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120.

The primary site 102 may include a primary network, which can be, for example, an office network, home network or other network installation. The primary site 102 network may be a private network, such as a network that may include security and access controls to restrict access to authorized users of the private network. Authorized users may include, for example, employees of a company at primary site 102, residents of a house, customers at a business, and so on.

In the illustrated example, the primary site 102 includes a controller 104 in communication with the network 120. The controller 104 may provide communication with the network 120 for the primary site 102, though it may not be the only point of communication with the network 120 for the primary site 102. A single controller 104 is illustrated, though the primary site may include multiple controllers and/or multiple communication points with network 120. In some embodiments, the controller 104 communicates with the network 120 through a router (not illustrated). In other embodiments, the controller 104 provides router functionality to the devices in the primary site 102.

A controller 104 may be operable to configure and manage network devices, such as at the primary site 102, and may also manage network devices at the remote sites 132, 134. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless access points (APs) 106a-c. Switches 108 and wireless APs 106a-c provide network connectivity to various client devices 110a-j. Using a connection to a switch 108 or AP 106a-c, a client device 110a-j may access network resources, including other devices on the (primary site 102) network and the network 120.

Examples of client devices may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, and the like.

Within the primary site 102, a switch 108 is included as one example of a point of access to the network established in primary site 102 for wired client devices 110i-j. Client devices 110i-j may connect to the switch 108 and through the switch 108, may be able to access other devices within the network configuration 100. The client devices 110i-j may also be able to access the network 120, through the switch 108. The client devices 110i-j may communicate with the switch 108 over a wired 112 connection. In the illustrated example, the switch 108 communicates with the controller 104 over a wired 112 connection, though this connection may also be wireless.

Wireless APs 106a-c are included as another example of a point of access to the network established in primary site 102 for client devices 110a-h. Each of APs 106a-c may be a combination of hardware, software, and/or firmware that is configured to provide wireless network connectivity to wireless client devices 110a-h. In the illustrated example, APs 106a-c can be managed and configured by the controller 104. APs 106a-c communicate with the controller 104 and the network over connections 112, which may be either wired or wireless interfaces.

The network configuration 100 may include one or more remote sites 132. A remote site 132 may be located in a different physical or geographical location from the primary site 102. In some cases, the remote site 132 may be in the same geographical location, or possibly the same building, as the primary site 102, but lacks a direct connection to the network located within the primary site 102. Instead, remote site 132 may utilize a connection over a different network, e.g., network 120. A remote site 132 such as the one illustrated in FIG. 1A may be, for example, a satellite office, another floor, or suite in a building, and so on. The remote site 132 may include a gateway device 134 for communicating with the network 120. A gateway device 134 may be a router, a digital-to-analog modem, a cable modem, a Digital Subscriber Line (DSL) modem, or some other network device configured to communicate to the network 120. The remote site 132 may also include a switch 138 and/or AP 136 in communication with the gateway device 134 over either wired or wireless connections. The switch 138 and AP 136 provide connectivity to the network for various client devices 140*a-d*.

In various embodiments, the remote site 132 may be in direct communication with primary site 102, such that client devices 140*a-d* at the remote site 132 access the network resources at the primary site 102 as if these client devices 140*a-d* were located at the primary site 102. In such embodiments, the remote site 132 is managed by the controller 104 at the primary site 102, and the controller 104 provides the necessary connectivity, security, and accessibility that enable the remote site 132's communication with the primary site 102. Once connected to the primary site 102, the remote site 132 may function as a part of a private network provided by the primary site 102.

In various embodiments, the network configuration 100 may include one or more smaller remote sites 142, comprising only a gateway device 144 for communicating with the network 120 and a wireless AP 146, by which various client devices 150*a-b* access the network 120. Such a remote site 142 may represent, for example, an individual employee's home or a temporary remote office. The remote site 142 may also be in communication with the primary site 102, such that the client devices 150*a-b* at remote site 142 access network resources at the primary site 102 as if these client devices 150*a-b* were located at the primary site 102. The remote site 142 may be managed by the controller 104 at the primary site 102 to make this transparency possible. Once connected to the primary site 102, the remote site 142 may function as a part of a private network provided by the primary site 102.

The network 120 may be a public or private network, such as the Internet, or other communication network to allow connectivity among the various sites 102, 130 to 142 as well as access to servers 160*a-b*. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities. The network 120 may include various content servers 160*a-b*. Content servers 160*a-b* may include various providers of multimedia downloadable and/or streaming content, including audio, video, graphical, and/or text content, or any combination thereof. Examples of content servers 160*a-b* include, for example, web servers, streaming radio and video providers, and cable and satellite television providers. The client devices 110*a-j*, 140*a-d*, 150*a-b* may request and access the multimedia content provided by the content servers 160*a-b*.

Although only 10 client devices 110*a-j* are illustrated at primary site 102 in the example of FIG. 1A, in various applications, a network may include dramatically larger quantities of client devices. For example, various wireless networks, such as in dense wireless deployments, may include hundreds, thousands, or even tens of thousands of client devices communicating with their respective APs, potentially at the same time. Furthermore, as there is a finite number of available wireless channels with which to communicate, these client devices communicating with their respective APs may attempt to use the same wireless channels at the same time. In a dense wireless deployment, such as a mesh deployment or a distributed multiple-input-multiple-output (D-MIMO) deployment, APs may be within range of each other's intra-CCA/intra-BSS coverage. APs within range of each other's intra-CCA/intra-BSS coverage may use different BSS color assignments but, nevertheless, suffer connection issues due to interference from each other. Furthermore, in deployments such as these, spatial reuse can be inefficient and increase interference and collisions, resulting in retransmissions and longer transmission times. Thus, spatial reuse and BSS color assignments, if not used in a manner appropriate for the deployment of the wireless network, may cause degradation in network performance. As further described herein, by adaptively enabling and disabling spatial reuse and adapting BSS color assignments, the disclosed systems and methods provide for improved reuse of wireless mediums while avoiding collisions.

Figure 1B:
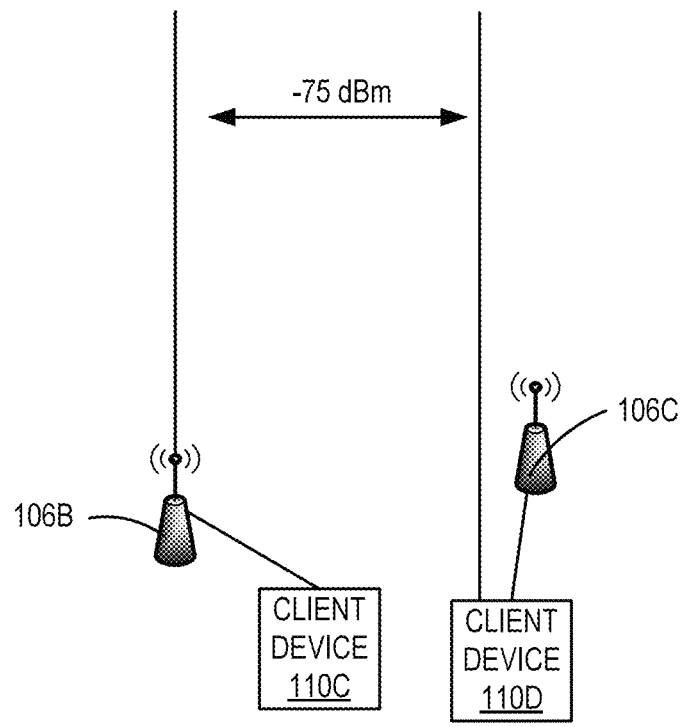
FIG. 1B illustrates an example of a spatial reuse scenario.

FIG. 1B illustrates an example of intra-BSS communication that may cause inter-BSS/OBSS interference in the context of the example network 100 illustrated in FIG. 1A. In the example of FIG. 1B, client device 110*c* (associated with AP 106*b*) may be transmitting data on a particular channel while client device 110*d* (associated to AP 106*c*) may also be operating on the same channel. Because client devices 110*c* and 110*d* are physically close to each other, they may be able to hear (e.g., detect) transmissions from each other above their packet detect (PD) thresholds, despite belonging to different BSSs. Because the respective PD thresholds of client devices 110*c*, 110*d* are being triggered by the transmissions from each other, client devices 110*c*, 110*d* are in contention with each other. Accordingly, client devices 110*c*, 110*d* will take turns accessing the channel, with each client device getting approximately half the available bandwidth and throughput of the channel, but they will not necessarily interfere with each other. That is, transmissions from client device 110*c* energy is not considered to be interference by AP 106*c* as it is too far away, while transmissions from client device 110*d* is not powerful enough to be heard by AP 106*b*, but client devices 110*c*, 110*d* are close enough to interfere, and so are prevented from transmitting simultaneously on the channel. It should be understood that the above is only an example, and that inter-BSS/OBSS interference can occur between other network devices, such as between two APs, or between an AP and a client device.

However, with spatial reuse, client devices 110*c*, 110*d* can coordinate with one another and can be allowed to transmit data at the same time with a high likelihood of success because AP 106*b* cannot hear client device 110*d*, and AP 106*c* cannot hear client device 110*c*. Thus, neither of APs 106*b*, 106*c* experiences interference from each other. The coordination comes about from the recognition (on a packet-by-packet basis) where a packet belongs to one BSS or another BSS. This determination can be accomplished using BSS coloring. It should be understood that the "color" is an index number (e.g., from 1 to 63) assigned to individual APs along with channel assignment, whether manually, through self-automated determination, or through external automated determination and assignment. When APs share the same channel and are in the same vicinity, they may have different BSS color assignments. When two BSSs operating on the same channel have the same BSS color assignment, a condition referred to as color collision occurs.

In some cases, spatial reuse allows for adjustments to the PD threshold to be made between a minimum of −82 dBm and a maximum of −62 dBm, modifying the signal detection threshold window to take advantage of an SR opportunity.

The amount of adjustment allowed may be determined by the transmit power used. Lowering the transmit power can reduce the potential for interference. A lower transmit power may also reduce the data rate, which may be balanced by increased transmit opportunities. As noted above, the advantages of spatial reuse diminish in dense wireless deployments. For example, APs that are within range of each other's inter-CCA coverage are within range of the signals with higher transmit power that the APs transmit. These higher transmit power signals can cause interference resulting in a low signal-to-interference-plus-noise ratio (SINR) from the interference. Thus, in order to realize the advantages of spatial reuse in dense wireless deployments, the disclosed systems and methods provide for adaptively enabling and disabling spatial reuse and adapting BSS color assignments as appropriate based on the deployment of a wireless network.

Figure 2A:
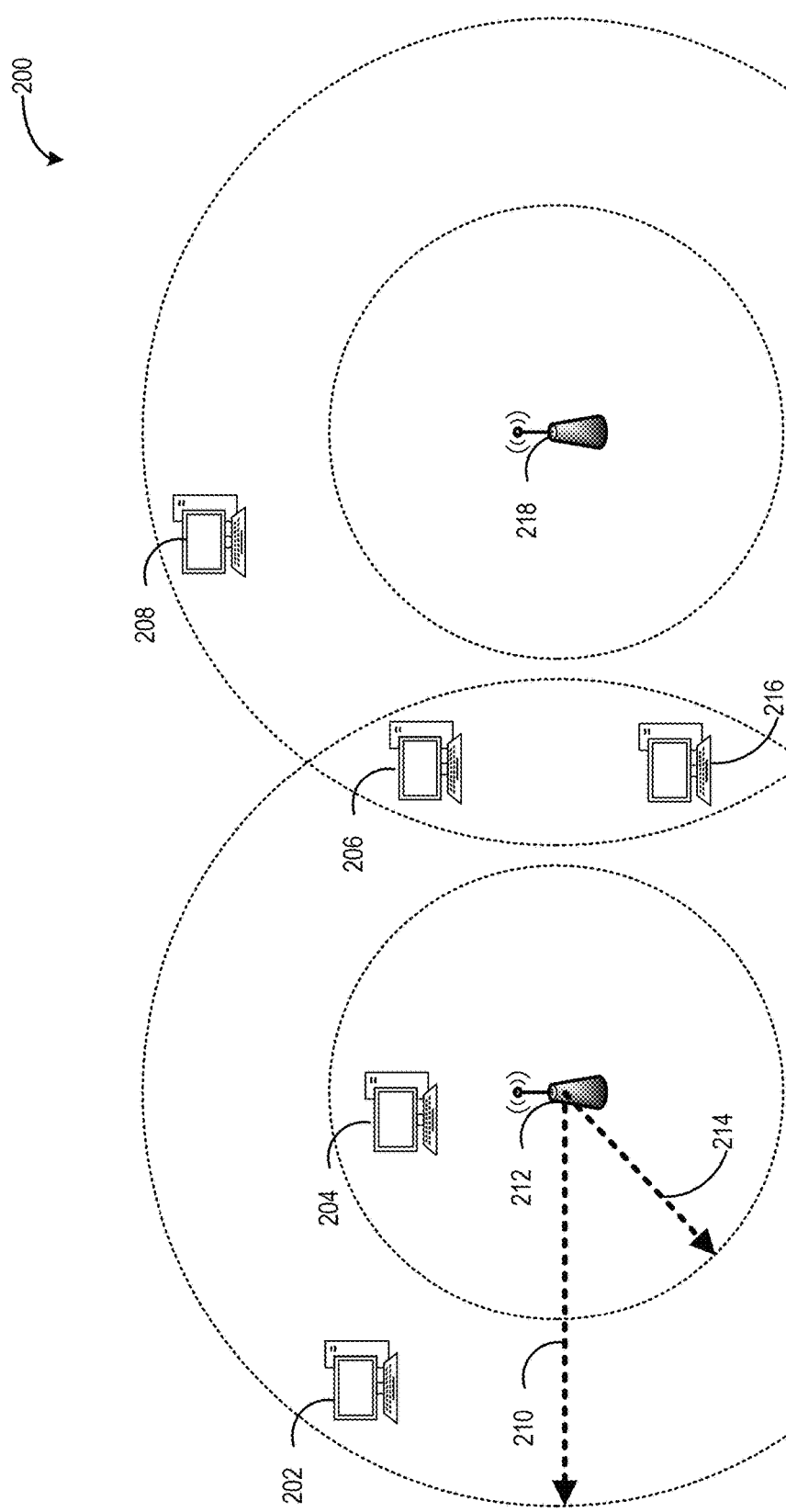
FIGS. 2A-2C illustrate example wireless network deployments associated with adaptive spatial reuse.

FIG. 2A illustrates an example wireless deployment 200 associated with spatial reuse. The example wireless deployment 200 can be, for example, implemented as one of the sites described with respect to FIG. 1A. As illustrated in FIG. 2A, the example wireless deployment 200 includes a first access point (AP) 212 with an associated inter-CCA coverage and intra-CCA coverage. The example wireless deployment 200 also includes a second AP 218 with an associated inter-CCA coverage and intra-CCA coverage. The inter-CCA coverage associated with the first AP 212 has an inter-CCA range 210. The intra-CCA coverage associated with the first AP 212 has an intra-CCA range 214. The inter-CCA coverage and the intra-CCA coverage associated with the second AP 218 can have similar ranges. In the example wireless deployment 200, the first AP 212 is not within the inter-CCA coverage of the second AP 218 and cannot hear transmissions from the second AP 218. The second AP 218 is not within the inter-CCA coverage of the first AP 212 and cannot hear transmissions from the first AP 212. Client device 202 is within the inter-CCA coverage of the first AP 212. Client device 204 is within the intra-CCA coverage of the first AP 212. Client device 208 is within the inter-CCA coverage of the second AP 218. Client device 206 and client device 216 are within the inter-CCA coverage of the first AP 212 and the inter-CCA coverage of the second AP 218. In the example wireless deployment 200, the first AP 212 and the second AP 218 can use the same wireless channel and enable parallel transmissions with different BSS color assignments to client devices 202, 204, 208 without the parallel transmissions interfering with each other. With respect to client devices 206, 216, parallel transmissions in the downlink direction (e.g., from APs 212, 218 to the client devices 206, 216) may interfere with each other and cause collisions as they are on the same wireless channel with similar transmit power. Parallel transmissions in the uplink direction (e.g., from client devices 206, 216 to the APs 212, 218) can be enabled. In wireless deployments such as the example wireless deployment 200, spatial reuse may be enabled and, while there may be some interference, most parallel transmissions are enabled without disruptive interference.

Figure 2B:
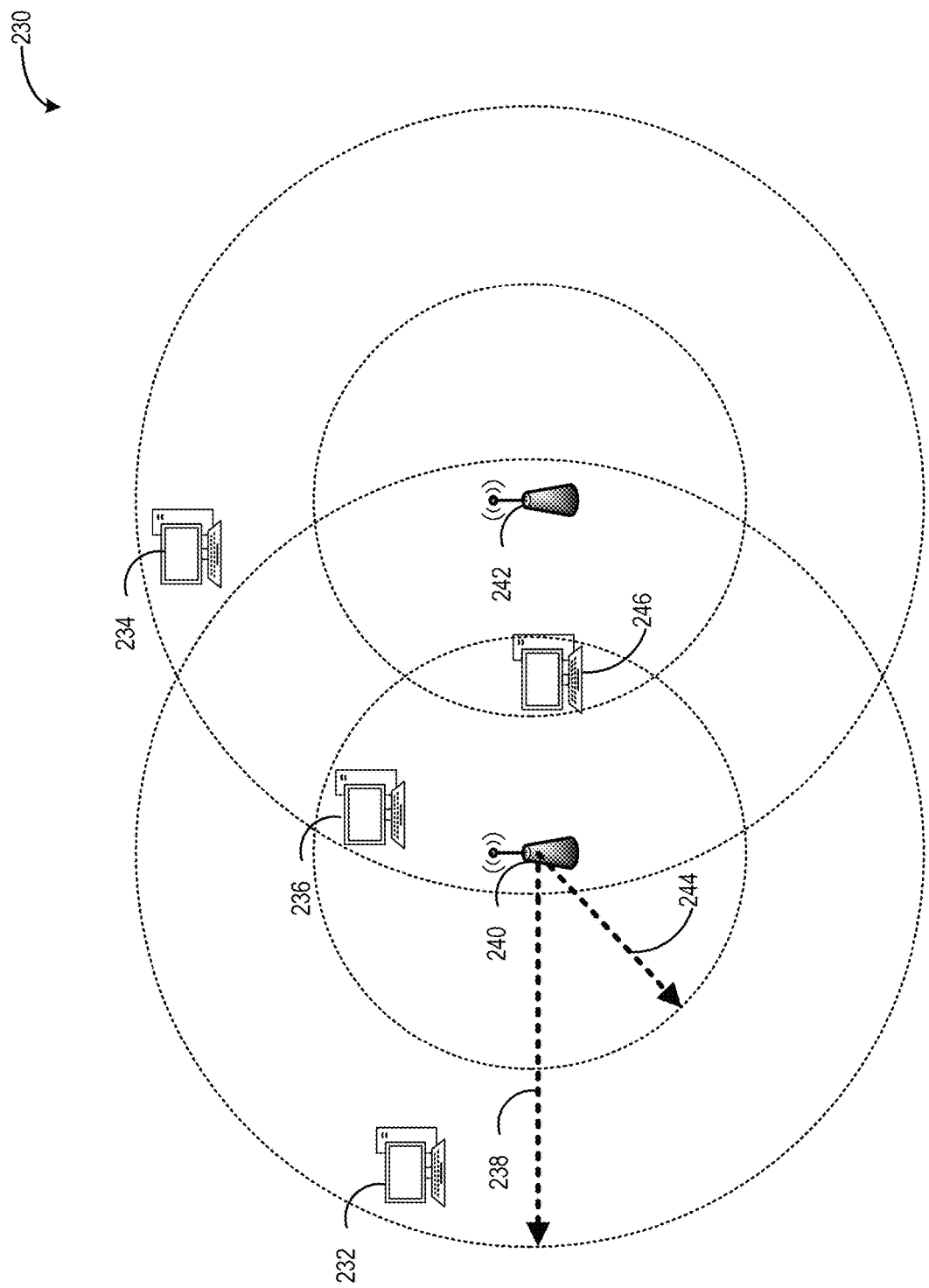

FIG. 2B illustrates an example wireless deployment 230 associated with spatial reuse. The example wireless deployment 230 can be, for example, implemented as one of the sites described with respect to FIG. 1A. As illustrated in FIG. 2B, the example wireless deployment 230 includes a first AP 240 with an associated inter-CCA coverage and intra-CCA coverage. The example wireless deployment 230 also includes a second AP 242 with an associated inter-CCA coverage and intra-CCA coverage. The inter-CCA coverage associated with the first AP 240 has an inter-CCA range 238. The intra-CCA coverage associated with the first AP 240 has an intra-CCA range 244. The inter-CCA coverage and the intra-CCA coverage associated with the second AP 242 can have similar ranges. In the example wireless deployment 230, the first AP 240 is within the inter-CCA coverage of the second AP 242, and the second AP 242 is within the inter-CCA coverage of the first AP 240. So, the first AP 240 can hear the inter-CCA transmissions from the second AP 242, and the second AP 242 can hear the inter-CCA transmission from the first AP 240. Client device 234 is within the inter-CCA coverage of the second AP 242. Client device 236 is within the intra-CCA coverage of the first AP 240 and the inter-CCA coverage of the second AP 242. Client device 246 is within the intra-CCA coverage of the first AP 212 and the intra-CCA coverage of the second AP 242. In the example wireless deployment 230, the first AP 240 and the second AP 242 can use the same wireless channel and enable parallel transmissions with different BSS color assignments to client devices 232, 234, 236, 242 without the parallel transmissions interfering with each other. Client device 232 can communicate with the first AP 240 without interference from transmissions associated with the second AP 242. Client device 234 can communicate with the second AP 242 without interference from transmissions associated with the first AP 240. Client device 236 can hear inter-CCA transmissions from the second AP 242, but these inter-CCA transmissions do not disrupt the intra-CCA transmissions from the first AP 240. So, client device 236 can communicate with the first AP 240 without disruptive interference from transmissions associated with the second AP 242. Client device 246 can communicate with the second AP 242 provided there is no concurrent intra-CCA transmission from the first AP 240. Similarly, client device 246 can communicate with the first AP 240 provided there is no concurrent intra-CCA transmission from the second AP 242. In wireless deployments such as the example wireless deployment 230, spatial reuse may be enabled, and parallel transmissions are generally enabled without disruptive interference.

Figure 2C:
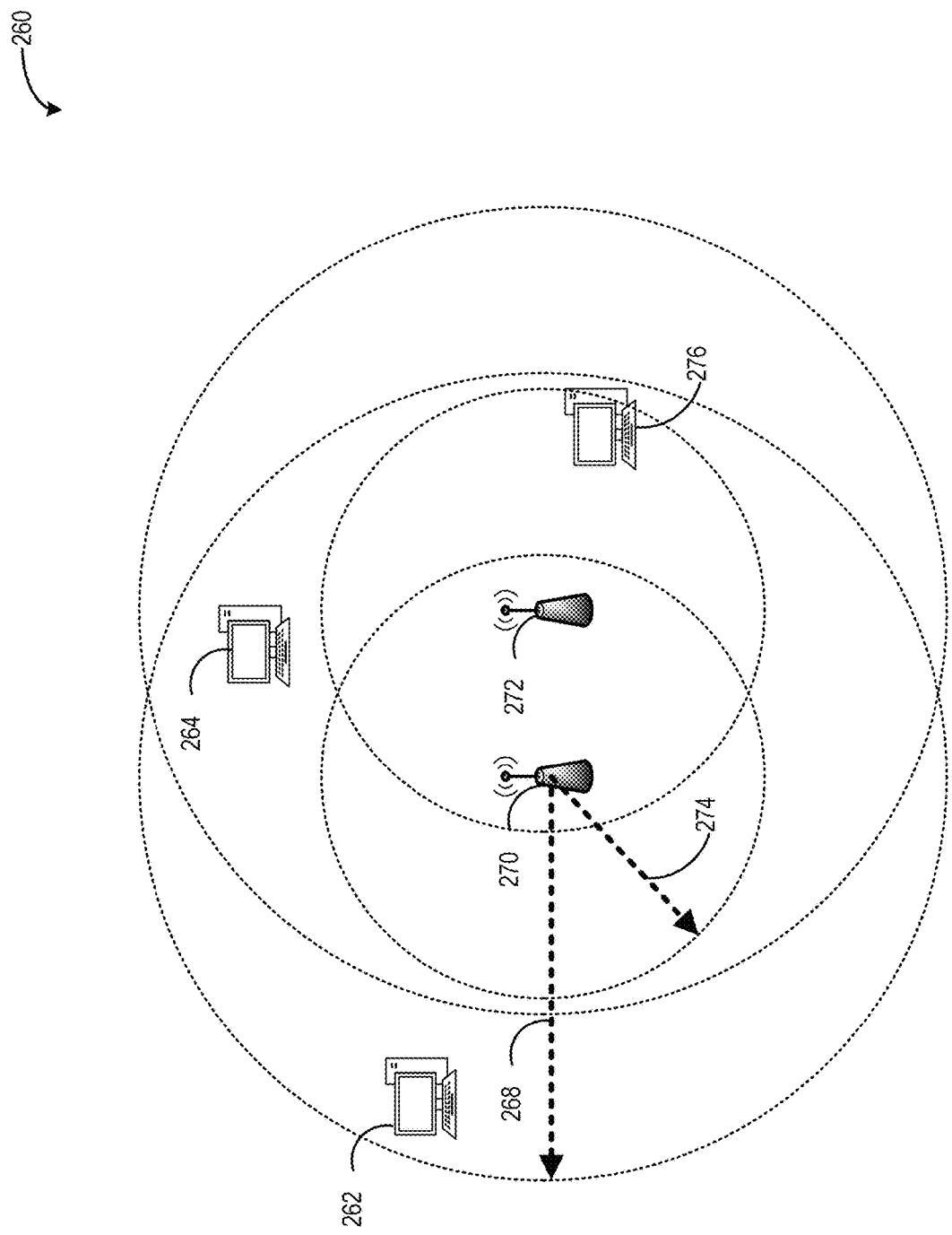

FIG. 2C illustrates an example wireless deployment 260 associated with spatial reuse. The example wireless deployment 260 can be, for example, implemented as one of the sites described with respect to FIG. 1A. As illustrated in FIG. 2C, the example wireless deployment 260 includes a first AP 270 with an associated inter-CCA coverage and intra-CCA coverage. The example wireless deployment 260 also includes a second AP 272 with an associated inter-CCA coverage and intra-CCA coverage. The inter-CCA coverage associated with the first AP 270 has an inter-CCA range 268. The intra-CCA coverage associated with the first AP 270 has an intra-CCA range 274. The inter-CCA coverage and the intra-CCA coverage associated with the second AP 272 can have similar ranges. In the example wireless deployment 260, the first AP 270 is within the intra-CCA coverage of the second AP 272, and the second AP 272 is within the intra-CCA coverage of the first AP 270. So, the first AP 270 can hear the inter-CCA transmissions and the intra-CCA transmissions from the second AP 272, and the second AP 272 can hear the inter-CCA transmission and the intra-CCA transmissions from the first AP 270. Client device 262 is within the inter-CCA coverage of the first AP 270. Client device 264 is within the inter-CCA coverage of the first AP 270 and the inter-CCA coverage of the second AP 272. Client device 276 is within the intra-CCA coverage of the second AP 272 and the inter-CCA coverage of the first AP 270. In the example wireless deployment 260, using the same wireless channel and enabling parallel transmissions with different BSS color assignments may cause network degradation from interference. Client device 262 can communicate with the first AP 270 without interference from transmissions associated with the second AP 272. Client device 264 can communicate with the first AP 270 provided there is no concurrent inter-CCA transmission from the second AP 272. Client device 276 can communicate with the second AP 272 without interference from transmissions associated with the first AP 270. As the first AP 270 and the second AP 272 are within the intra-CCA coverage of each other, the first AP 270 and the second AP 272 may encounter connection issues when attempting to communicate concurrently with their respective client devices due to the interference from each other in the air. In wireless deployments such as the example wireless deployment 260, spatial reuse and parallel transmissions may increase interference and cause degradation in network performance. As illustrated in FIGS. 2A-2C, adaptively enabling and disabling spatial reuse and adapting BSS color assignments allows for spatial reuse to be used effectively as appropriate for a wireless deployment.

Figure 3:
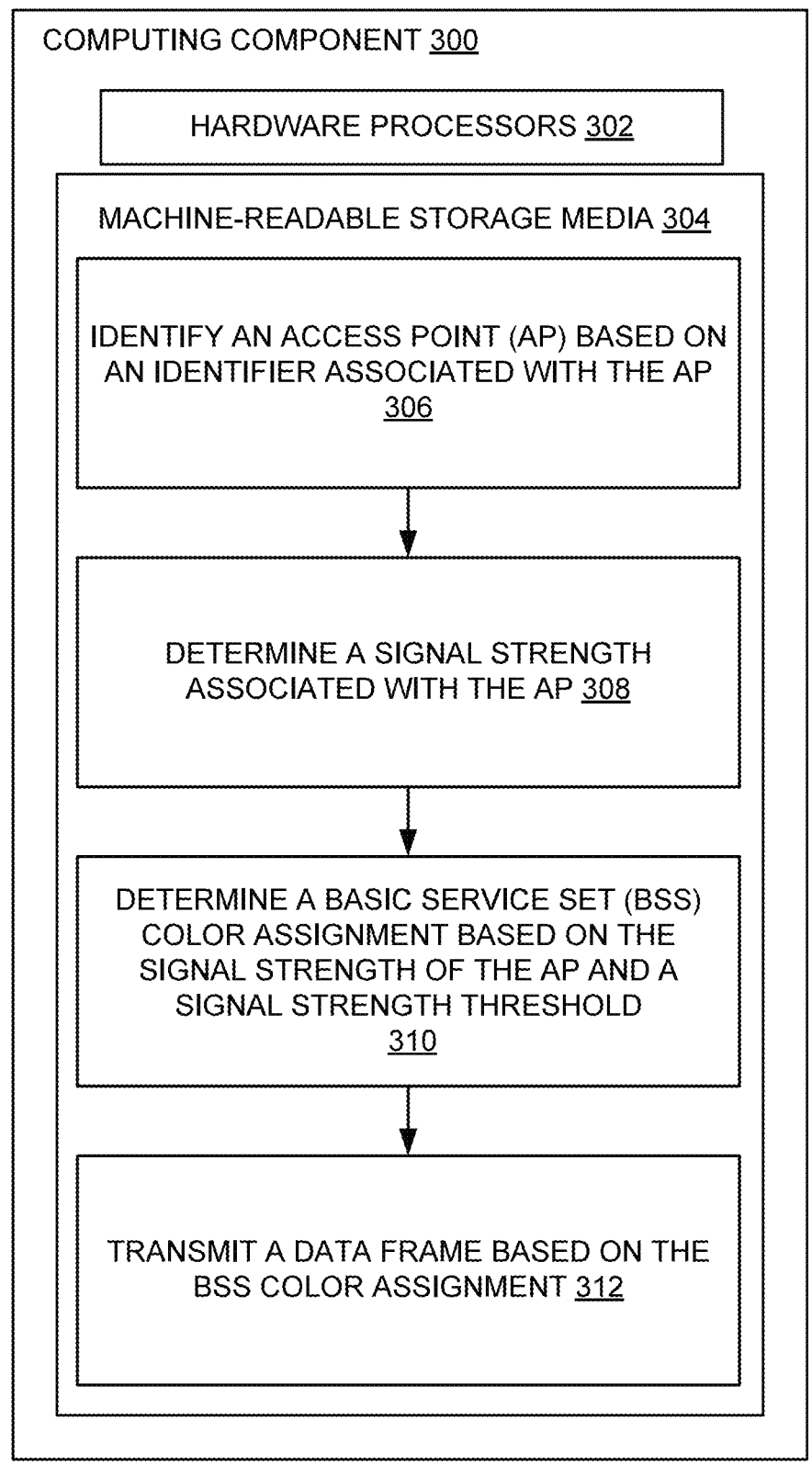
FIG. 3 illustrates a block diagram of an example computing component or device associated with adaptive spatial reuse.

FIG. 3 illustrates an example computing component 300 that may be used to implement adaptive spatial reuse in accordance with various embodiments. The example computing component 300 may be, for example, an access point (AP), a server computer, a controller, or any other similar computing component capable of processing data. In the example implementation of FIG. 3, the computing component 300 includes a hardware processor 302, and machine-readable storage medium 304.

Hardware processor 302 may be one or more central processing units (CPUs), semiconductor-based microprocessors, and/or other hardware devices suitable for retrieval and execution of instructions stored in machine-readable storage medium 204. Hardware processor 302 may fetch, decode, and execute instructions, such as instructions 306-312, to control processes or operations for opportunistic spatial reuse. As an alternative or in addition to retrieving and executing instructions, hardware processor 302 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 304, may be any electronic, magnetic, optical, or other physical storage device that contains or stores executable instructions. Thus, machine-readable storage medium 304 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 304 may be a non-transitory storage medium, where the term "non-transitory" does not encompass transitory propagating signals. As described in detail below, machine-readable storage medium 304 may be encoded with executable instructions, for example, instructions 306-312.

Hardware processor 302 may execute instruction 306 to identify an access point (AP) based on an identifier associated with the AP. In various embodiments, an AP may periodically broadcast a basic service set (BSS) beacon or an overlapping BSS (OBSS) beacon if spatial reuse is enabled. The BSS beacon (or OBSS beacon) provides information to devices within a proximity (e.g., basic service area) of the AP. The information can include, for example, which BSS color assignment the AP is using and which channel the AP is using. The information allows the devices to connect with the AP and communicate with the AP. The information in the BSS beacon (or OBSS beacon) can provide various capabilities associated with the AP. For example, the BSS beacon can (or OBSS beacon) can include an organizationally unique identifier (OUI) associated with a manufacturer or vendor of the AP. Based on the manufacturer or vendor of the AP, various capabilities associated with the AP can be determined, such as whether the AP is capable of coordinating the adaptive enabling and disabling of spatial reuse and adapting BSS color assignments.

For example, a wireless network, such as the network deployment illustrated in FIG. 1A, can include a first AP and a second AP. The first AP and the second AP can be within a proximity of each other such that they can hear each other. For example, the first AP and the second AP can be deployed as illustrated in FIGS. 2B-2C. The first AP in the wireless network can receive an OBSS beacon transmitted by the second AP. The OBSS beacon transmitted by the second AP can include various information associated with the second AP. Based on the OBSS beacon, the first AP can determine, for example, that the second AP is operating on the same channel as the first AP and using a different BSS color assignment. The first AP can also determine that the second AP has similar capabilities as the first AP (e.g., they are from the same product family). These similar capabilities can include the capability to adaptively enable and disable spatial reuse and adapt BSS color assignments based on the wireless network. With this information, the first AP can implement adaptive spatial reuse without potential conflicts with the second AP. Many variations are possible.

Hardware processor 302 may execute instruction 308 to determine a signal strength associated with the AP. In various embodiments, a signal strength associated with an AP can be determined based on, for example, a received signal strength indicator (RSSI) or other measure of signal strength. In some cases, a received channel power indicator (RCPI) or a decibels referenced to one milliwatt (dBm) can be used to measure the signal strength. A signal strength associated with an AP can indicate a proximity of the AP and a likelihood of the AP interfering with communications. An AP associated with a higher signal strength is likely to be closer than another AP associated with a lower signal strength. Similarly, an AP associated with a higher signal strength may have a higher likelihood of interfering with communications than another AP associated with a lower signal strength. Accordingly, an AP can adaptively enable and disable spatial reuse and adapt BSS color assignments based on the signal strength associated with other APs.

For example, a wireless network, such as the network deployment illustrated in FIG. 1A, can include a first AP and a second AP. The first AP and the second AP can be within a proximity of each other such that they can hear each other. For example, the first AP and the second AP can be deployed as illustrated in FIGS. 2B-2C. The first AP in the wireless network can receive an OBSS beacon transmitted by the second AP. The first AP can determine a signal strength, such as a RSSI, associated with the second AP based on the OBSS beacon transmitted by the second AP. The signal strength associated with the second AP can indicate a proximity between the first AP and the second AP and a likelihood that transmissions from the second AP may interfere with communications between the first AP and client devices associated with the first AP. For example, a signal strength associated with the second AP, if the first AP and the second AP in the wireless network were deployed as illustrated in FIG. 2C, can be higher than a signal strength associated with the second AP if the first AP and the second AP were deployed as illustrated in FIG. 2B. The first AP can adaptively enable and disable spatial reuse and adapt BSS color assignments based on the signal strength associated with the second AP. Many variations are possible.

Hardware processor 302 may execute instruction 310 to determine a basic service set (BSS) color assignment based on the signal strength of the AP and a signal strength threshold. As described herein, a signal strength, such as RSSI, associated with another AP can indicate a proximity and a likelihood that transmissions from the other AP may interfere with communications. In various embodiments, an AP can determine a BSS color assignment based on the signal strength of another AP to account for the proximity of the other AP and the likelihood of interference from the other AP. The BSS color assignment can be determined based on whether the signal strength of the other AP exceeds a signal strength threshold, such as an RSSI threshold. The signal strength threshold can be based on a signal strength at which intra-CCA transmissions from the other AP interferes with communications. In various embodiments, an AP can select a BSS color assignment that matches the BSS color assignment of another AP associated with a signal strength that exceeds a signal strength threshold. The AP can select, or remain using, a different BSS color assignment if the signal strength is within the signal strength threshold. The AP, alternatively or in addition, can disable spatial reuse based on the signal strength of the other AP exceeding the signal strength threshold. The AP can enable, or remain using, spatial reuse if the signal strength is within the signal strength threshold. In some cases, various client devices generate color collision reports when the client devices detect transmissions from APs using the same BSS color assignment. Thus, if an AP selects a BSS color assignment that matches the BSS color assignment of another AP associated with a signal strength that exceeds a signal strength threshold, the AP may receive color collision reports indicating a color collision (e.g., the AP and the other AP are using the same BSS color assignment). In these cases, the AP can ignore the color collision reports instead of changing BSS color assignments in response to the color collision reports.

For example, a wireless network, such as the network deployment illustrated in FIG. 1A, can include a first AP and a second AP. The first AP and the second AP can be within a proximity of each other such that they can hear each other. For example, the first AP and the second AP can be deployed as illustrated in FIG. 2C. The first AP in the wireless network can receive an OBSS beacon transmitted by the second AP. The OBSS beacon transmitted by the second AP can include various information associated with the second AP. Based on the OBSS beacon, the first AP can determine, for example, that the second AP is operating on the same channel as the first AP and using a different BSS color assignment. Additionally, the first AP can determine a signal strength, such as a RSSI, associated with the second AP based on the OBSS beacon transmitted by the second AP. In this example, the signal strength associated with the second AP can exceed a signal strength threshold. Based on the signal strength exceeding the signal strength threshold, the first AP can select a BSS color assignment that matches the BSS color assignment used by the second AP. By selecting a BSS color assignment that matches the BSS color assignment used by the second AP, the first AP can effectively prevent parallel transmissions in a scenario where interference from the second AP would render parallel transmissions ineffective. The first AP can also disable use of spatial reuse to prevent parallel transmissions. Many variations are possible.

Hardware processor 302 may execute instruction 312 to transmit a data frame based on the BSS color assignment. In various embodiments, an AP can transmit a data frame that includes a BSS color assignment. The AP transmits the data frame following a determination that a channel on which the data frame is to be transmitted is clear of other transmissions with the same BSS color assignment as the data frame. In this way, the AP avoids parallel transmissions of data frames with the same BSS color assignment on the same channel. For example, as described with respect to FIG. 1B, transmission with spatial reuse enabled can involve transmission of a first data frame with a first BSS color assignment in parallel with a second data frame with a second BSS color assignment. The parallel transmission is facilitated by the second data frame, with the second BSS color, being transmitted with a reduced transmit power to reduce the potential for interference with the first data frame. However, as described herein, parallel transmissions from APs within a relatively close proximity may interfere with each other and degrade network performance. To transmit a data frame with spatial reuse disabled, a device, such an AP waits for a channel to be free (e.g., no other devices are transmitting on the channel) to transmit the data frame. Thus, an AP transmitting a data frame with the same BSS color assignment as another AP prevents parallel transmissions by the AP and the other AP. Alternatively, or in addition, the AP can disable spatial reuse, which can prevent parallel transmissions by the AP and the other AP. In this way, the AP can adaptively enable and disable spatial reuse and adapt BSS color assignments in its transmission of data frames, allowing the data frames to be transmitted so as to avoid collisions in dense wireless deployments.

Figure 4:
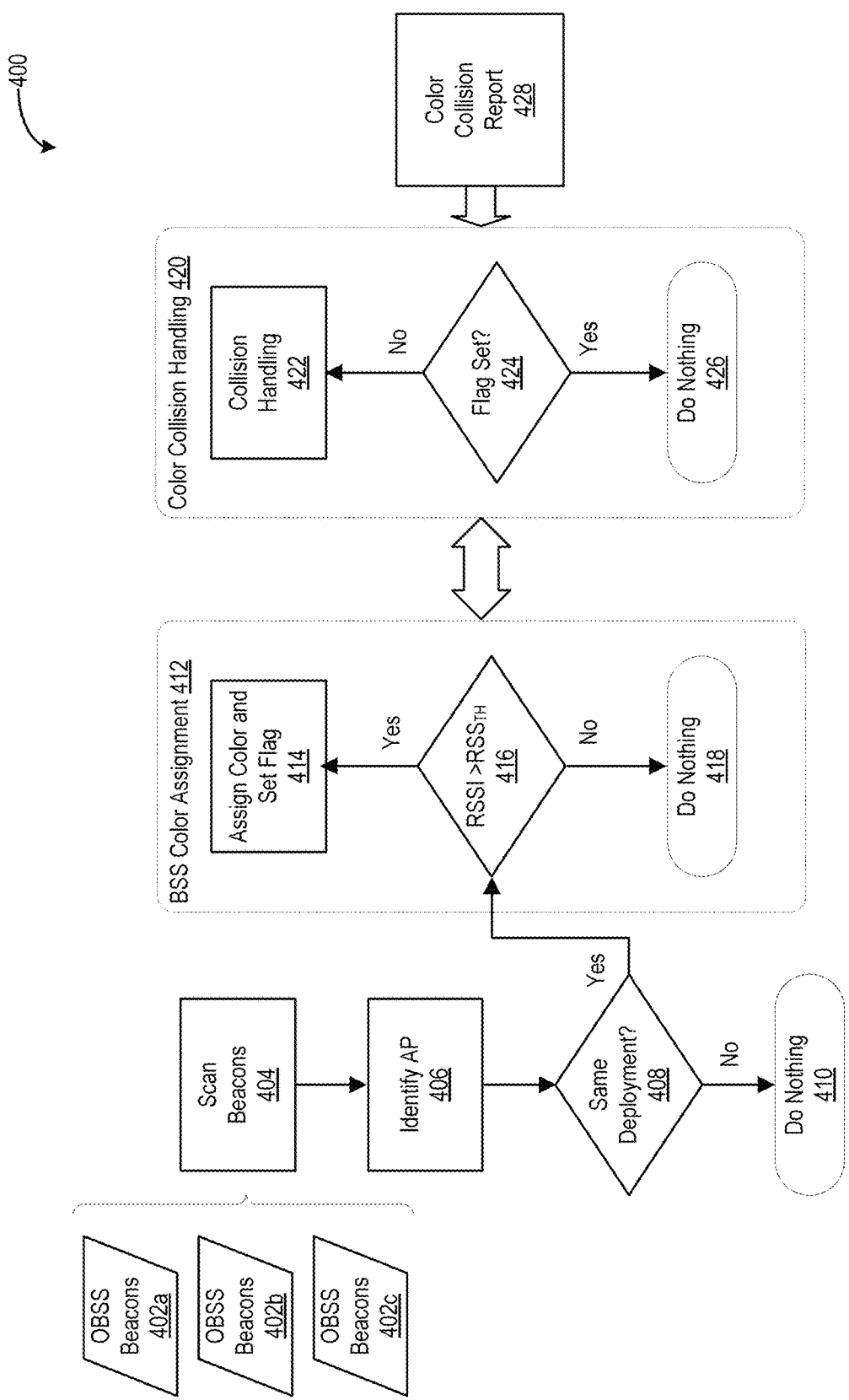
FIG. 4 illustrates an example flow chart associated with adaptive spatial reuse.

FIG. 4 illustrates an example flow chart 400 associated with adaptive spatial reuse. The example flow chart 400 can be associated with one or more functions performed by, for example, the example computing component 300 of FIG. 3. It should be understood that there can be additional, fewer, or alternative steps performed in similar or alternative orders, or in parallel, based on the various features and embodiments discussed herein unless otherwise stated.

As illustrated in FIG. 4, the example flow chart 400 depicts steps associated with adaptive spatial reuse that can be performed, for example, by an access point (AP). At step 404, the AP can scan overlapping basic service set (OBSS) beacons. For example, the AP can scan OBSS beacons 402a, 402b, 402c. At step 406, the AP can identify one or more APs associated with OBSS beacons 402a, 402b, 402c. The identification can be based on, for example, organizationally unique identifiers (OUIs) in basic service set identifiers (BSSIDs) associated with OBSS beacons 402a, 402b, 402c. At step 408, the AP can determine whether the identified APs are associated with the same deployment. If the identified APs are associated with different deployments, then the AP, at step 410, does nothing, which involves not adapting basic service set (BSS) color assignments or adaptively enabling and disabling spatial reuse. If the identified APs are associated with the same deployment, then the AP performs a BSS color assignment function 412. At step 416, the AP checks if the receiving signal strength indicator (RSSI) exceeds a RSSI threshold ($RSSI_{TH}$). If the RSSI exceeds $RSSI_{TH}$, then the AP, at step 414, assigns a BSS color assignment and sets a flag. The BSS color assignment can be assigned to the same as the BSS color assignment of the APs associated with the RSSI that exceeds the $RSSI_{TH}$. The flag can indicate that adaptive spatial reuse is being employed and that the assignment of the same BSS colors is to be maintained in case of color collisions. If the RSSI does not exceed the $RSSI_{TH}$, then the AP, at step 418, does nothing, which involves not adapting BSS color assignments or adaptively enabling and disabling spatial reuse. If a flag to indicate that adaptive spatial reuse is being employed has been set, the flag can be cleared. At step 428, the AP receives a color collision report. The color collision report can be received from a client device that detected multiple APs using the same BSS color assignment. Based on the color collision report, the AP performs a color collision handling function 420. At step 424, the AP determines whether a flag associated with adaptive spatial reuse is set. If the flag is not set, then the AP, at step 422, performs collision handling. Collision handling can involve changing a BSS color assignment used by the AP to avoid color collisions. If the flag is set, then the AP, at step 426, does nothing, which involves ignoring the color collision report and continuing to use the same BSS color assignment as the other APs associated with RSSI that exceeds $RSSI_{TH}$. Alternatively, or in addition, the steps described herein can involve adaptively enabling and disabling spatial reuse. For example, in response to a determination that the RSSI of another AP exceeds $RSSI_{TH}$, an AP can disable spatial reuse (and select a matching BSS color assignment) and set a flag associated with the disabling of spatial reuse (and selecting the matching BSS color assignment). In response to a color collision report, the AP can continue to disable spatial reuse (and selecting the matching BSS color assignment) if the flag is set or enable spatial reuse (and select a different BSS color assignment) if the flag is not set. Many variations are possible.

Figure 5:
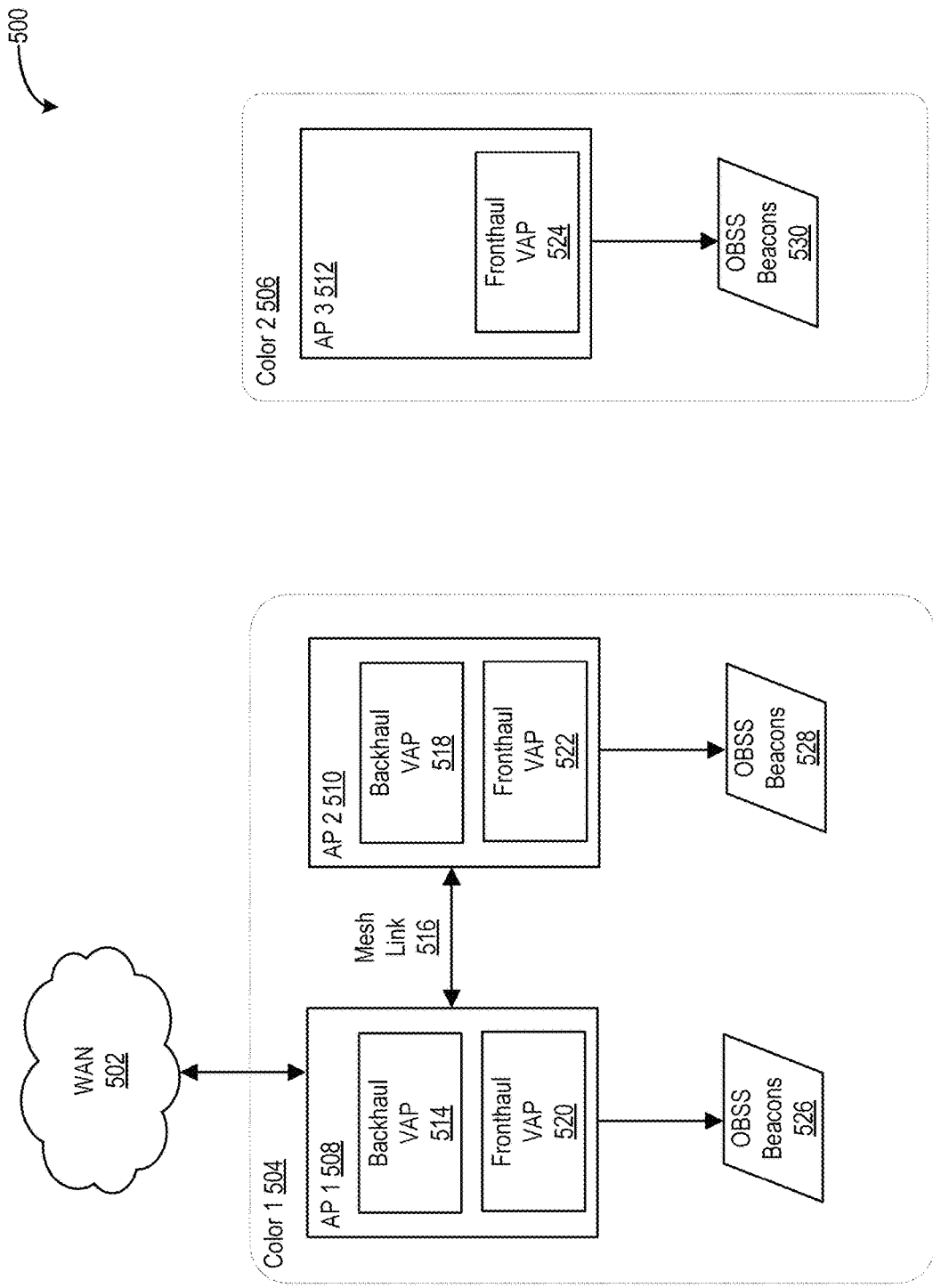
FIG. 5 illustrates an example block diagram of a wireless network deployment associated with adaptive spatial reuse.

FIG. 5 illustrates an example block diagram 500 of a wireless network deployment associated with adaptive spatial reuse. The wireless deployment, for example, can be implemented as one of the sites described with respect to FIG. 1A. As illustrated in FIG. 5, the wireless network deployment includes a mesh deployment and a non-mesh deployment. The mesh deployment includes a first AP 508 and a second AP 510. The first AP 508 includes a first backhaul VAP 514 and a first fronthaul VAP 520. The second AP 510 includes a second backhaul VAP 518 and a second fronthaul VAP 522. A mesh link 516 is maintained between the first AP 508 and the second AP 510 by the first backhaul VAP 514 and the second backhaul VAP 518. In this example, the first AP 508 can be a mesh portal that provides accessibility to a wide area network (WAN) 502, or other network resource. The first AP 508 can transmit OBSS beacons 526, and the second AP can transmit OBSS beacons 528. In this example, the first AP and the second AP may be deployed in a relatively close proximity, such as that illustrated in FIG. 2C. Accordingly, the first AP 508 and the second AP 510 can both use a first BSS color assignment 504. By using the same BSS color assignment, the first BSS color assignment 504, the first AP 508 and the second AP 510 can avoid parallel transmissions that have a high likelihood of interfering with each other. Also illustrated in FIG. 5, the non-mesh deployment can include a third AP 512. The third AP 512 can include a third fronthaul VAP 524. The third AP 512 can transmit OBSS beacons 530. As the third AP 512 is not part of the mesh deployment of the first AP 508 and the second AP 510, the third AP 512 can use a second BSS color assignment 506 that is different from the first BSS color assignment 504. Many variations are possible.

Figure 6:
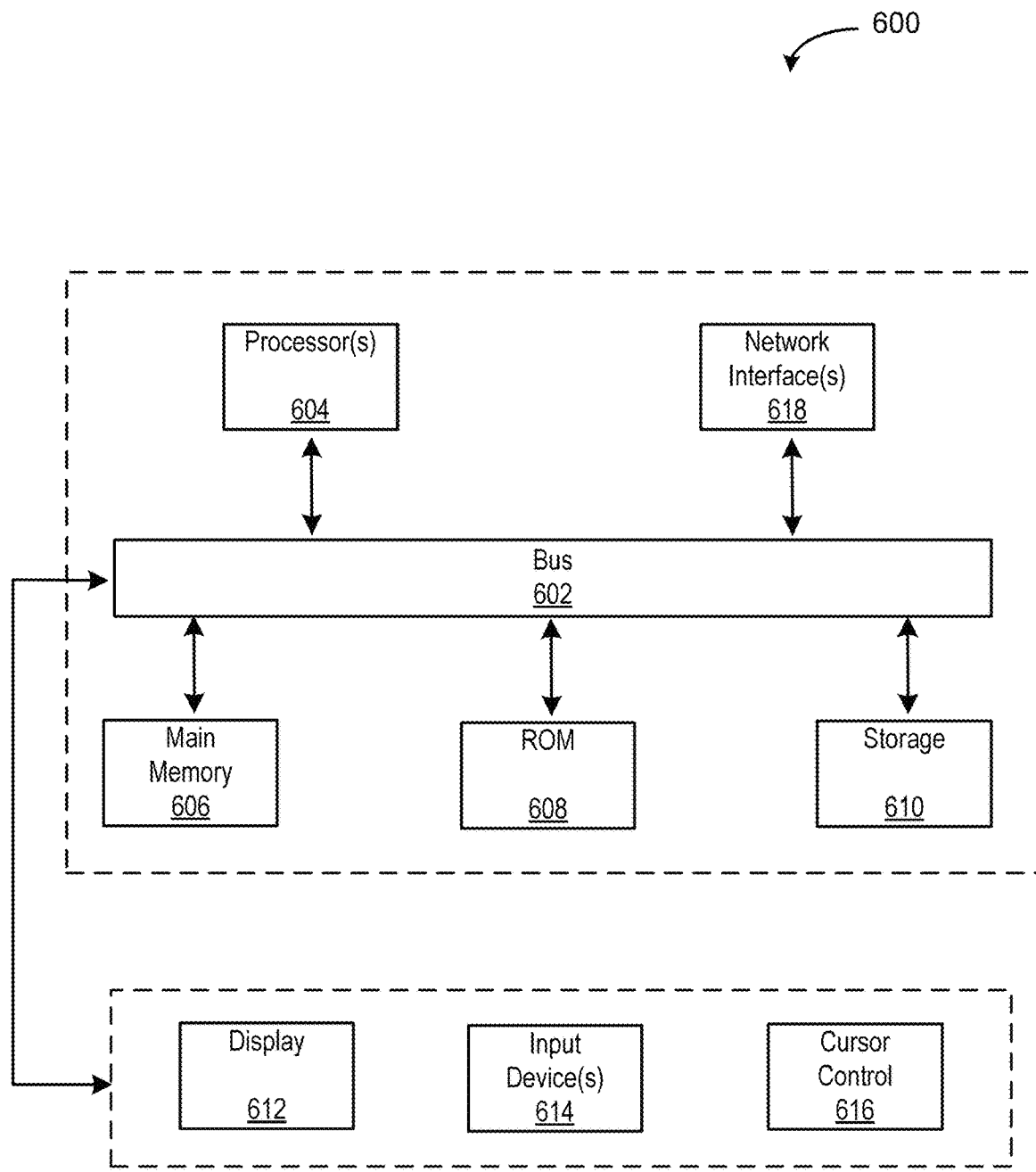
FIG. 6 illustrates an example computing component that may be used to implement various features of embodiments described in the present disclosure.

FIG. 6 depicts a block diagram of an example computer system 600 in which various of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a liquid crystal display (LCD) (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

The computer system 600 also includes a communication interface 618 coupled to bus 602. Network interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, network interface 618 may be a local area network (LAN) card to provide a data communication connection to a compatible LAN (or WAN component to communicated with a WAN). Wireless links may also be implemented. In any such implementation, network interface 618 sends and receives electrical, electromagnetic, or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the worldwide packet data communication network now commonly referred to as the "Internet." Local network and Internet both use electrical, electromagnetic, or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network, and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 600.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method comprising:
    identifying, by a first access point (AP), a second AP based on an identifier associated with the second AP;
    determining, by the first AP, a signal strength associated with the second AP;
    determining, by the first AP, a basic service set (BSS) color assignment based on the signal strength of the second AP and a signal strength threshold by:
    selecting, by the first AP, a BSS color assignment that matches a BSS color assignment associated with the second AP based on the signal strength of the second AP exceeding the signal strength threshold; or
    selecting, by the first AP, a BSS color assignment that differs from a BSS color assignment associated with the second AP based on the signal strength of the second AP being within the signal strength threshold; and
    transmitting, by the first AP, a data frame based on the BSS color assignment.

2. The method of claim 1, wherein the signal strength is determined based on the identifier associated with the second AP.

3. The method of claim 1, wherein the BSS color assignment determined by the first AP is further based on a BSS color assignment of the second AP.

4. The method of claim 1, further comprising:
    determining, by the first AP, a flag based on the signal strength of the second AP and the signal strength threshold; and
    receiving, by the first AP, a color collision report, wherein the determining the BSS color assignment is further based on the flag and the received color collision report.

5. The method of claim 1, further comprising:
    determining, by the first AP, whether to enable or disable spatial reuse based on the signal strength of the second AP and the signal strength threshold, wherein spatial reuse is disabled if the signal strength of the second AP exceeds the signal strength threshold and spatial reuse is enabled if the signal strength of the second AP is within the signal strength threshold.

6. The method of claim 1, further comprising:
    determining, by the first AP, a vendor associated with the second AP based on an organizationally unique identifier (OUI) included in the identifier associated with the second AP, wherein the determining the BSS color assignment is further based on the vendor associated with the second AP.

7. The method of claim 1, wherein the transmitting the data frame comprises:
    determining, by the first AP, that a channel on which the data frame is to be transmitted is clear of other transmissions with the same BSS color assignment as the data frame.

8. A system, comprising:
    a processor; and
    a memory operatively connected to the processor, and including computer code that when executed, causes the system to:
        identify an access point (AP) based on an identifier associated with the AP;
        determine a signal strength associated with the AP;
        determine whether to enable spatial reuse based on the signal strength of the AP and a signal strength threshold, wherein determining whether to enable spatial reuse comprises:
            disable spatial reuse based on the signal strength of the AP exceeding the signal strength threshold; or
            enable spatial reuse based on the signal strength of the AP being within the signal strength threshold; and
        transmit a data frame based on the determination of whether to enable spatial reuse.

9. The system of claim 8, wherein the signal strength is determined based on the identifier associated with the AP.

10. The system of claim 8, wherein the computer code further causes the system to:
    determine a flag based on the signal strength of the AP and the signal strength threshold; and
    receive a color collision report, wherein the determining whether to enable spatial reuse is further based on the flag and the received color collision report.

11. The system of claim 8, wherein the computer code further causes the system to:
    determine a basic service set (BSS) color assignment based on the signal strength of the AP and the signal strength threshold, wherein the BSS color assignment matches a BSS color assignment of the AP if the signal strength of the AP exceeds the signal strength threshold and the BSS color assignment differs from the BSS color assignment of the AP if the signal strength of the AP is within the signal strength threshold.

12. The system of claim 8, wherein the computer code further causes the system to:
    determine a vendor associated with the AP based on an organizationally unique identifier (OUI) included in the identifier associated with the AP, wherein the determining whether to enable spatial reuse is further based on the vendor associated with the AP.

13. A non-transitory computer-readable storage medium including instructions that, when executed by at least one processor of a computing system, cause the computing system to:
    identifying an access point (AP) based on an identifier associated with the AP;
    determining a signal strength associated with the AP;
    determining a flag based on the signal strength associated with the AP and a signal strength threshold, wherein determining the flag comprises:
        setting the flag based on the signal strength of the AP exceeding the signal strength threshold; or
        clearing the flag based on the signal strength of the AP being within the signal strength threshold;
    receiving a color collision report;
    determining a basic service set (BSS) color assignment based on the color collision report and the flag; and transmitting a data frame based on the BSS color assignment.

14. The non-transitory computer-readable storage medium of claim 13, wherein the signal strength is determined based on the identifier associated with the AP.

15. The non-transitory computer-readable storage medium of claim 13, wherein the instructions further cause the computing system to:
   determine whether to enable or disable spatial reuse based on the signal strength of the AP and the signal strength threshold, wherein spatial reuse is disabled if the signal strength of the AP exceeds the signal strength threshold and spatial reuse is enabled if the signal strength of the AP is within the signal strength threshold.

16. The non-transitory computer-readable storage medium of claim 13, wherein the instructions further cause the computing system to:
   determine a basic service set (BSS) color assignment based on the signal strength of the AP and the signal strength threshold, wherein the BSS color assignment matches a BSS color assignment of the AP if the signal strength of the AP exceeds the signal strength threshold and the BSS color assignment differs from the BSS color assignment of the AP if the signal strength of the AP is within the signal strength threshold.

17. The non-transitory computer-readable storage medium of claim 13, wherein the instructions further cause the computing system to:
   determine a vendor associated with the AP based on an organizationally unique identifier (OUI) included in the identifier associated with the AP, wherein the determining the flag is further based on the vendor associated with the AP.

* * * * *